United States Patent
Wu et al.

(10) Patent No.: US 11,946,831 B2
(45) Date of Patent: Apr. 2, 2024

(54) METHOD FOR DETERMINING ACTIVE JACKING FORCE OF TUNNELING CLOSELY UNDERCROSSING EXISTING STATION

(71) Applicant: SHANDONG JIANZHU UNIVERSITY, Shandong (CN)

(72) Inventors: Shengzhi Wu, Jinan (CN); Guangbiao Shao, Jinan (CN); Erbin Liang, Jinan (CN); Jun Wang, Jinan (CN); Guohui Liu, Jinan (CN); Zhikang Wang, Jinan (CN); Jianyong Han, Jinan (CN)

(73) Assignee: SHANDONG JIANZHU UNIVERSITY, Jinan (CN)

( * ) Notice: Subject to any disclaimer, the term of this patent is extended or adjusted under 35 U.S.C. 154(b) by 0 days.

(21) Appl. No.: 18/141,025

(22) Filed: Apr. 28, 2023

(65) Prior Publication Data

US 2024/0011864 A1    Jan. 11, 2024

(30) Foreign Application Priority Data

Jul. 8, 2022  (CN) .......................... 202210801408.3

(51) Int. Cl.
*G01M 5/00* (2006.01)
*B66F 3/24* (2006.01)

(52) U.S. Cl.
CPC ............. *G01M 5/0041* (2013.01); *B66F 3/24* (2013.01); *G01M 5/0025* (2013.01)

(58) Field of Classification Search
CPC ...... G01M 5/0041; G01M 5/0025; B66F 3/24
See application file for complete search history.

(56) References Cited

U.S. PATENT DOCUMENTS

| | | | |
|---|---|---|---|
| 5,176,474 A * | 1/1993 | Mason ................... | E21D 19/04 405/303 |
| 6,347,838 B1 * | 2/2002 | Mukaidani ............. | E21D 9/104 299/59 |
| 2021/0239879 A1 | 8/2021 | Brytik et al. | |

FOREIGN PATENT DOCUMENTS

| CN | 111335916 A | 6/2020 |
|---|---|---|
| CN | 111859718 A | 10/2020 |

(Continued)

OTHER PUBLICATIONS

Liang, R., Kang, C., Xiang, L. et al. Responses of in-service shield tunnel to overcrossing tunnelling in soft ground. Environ Earth Sci 80, 183 (2021). https://doi.org/10.1007/s12665-021-09374-3 (Year: 2021).*

(Continued)

*Primary Examiner* — Michael J Dalbo
*Assistant Examiner* — Denise R Karavias
(74) *Attorney, Agent, or Firm* — Oliff PLC (57) ABSTRACT

Determining an active jacking force of a tunneling closely undercrossing existing station, includes: acquiring design parameters of stations, and geological parameters of a construction site; obtaining a stress solution expression of the active jacking force on the existing station to obtain a stress solution of any point in a semi-infinite space under the action of a vertical load, replacing the vertical load with a vertical load acting on the existing station, and obtain a vertical stress solution of the existing station; obtaining a relational expression between the deflection and the stress solution of the existing station; and substituting the stress solution expression of the active jacking force into the relational expression between the deflection and the stress solution of the existing station according to boundary conditions at both ends of a beam on elastic foundation to obtain the active (Continued)

jacking force that controls the deflection of the existing station.

4 Claims, 2 Drawing Sheets

(56) References Cited

FOREIGN PATENT DOCUMENTS

| CN | 112832830 A | 5/2021 |
|---|---|---|
| CN | 214273664 U | 9/2021 |

OTHER PUBLICATIONS

Espacenet machine translation, Liu Guolong et al., "Pre-jacking structure of subway station closely attached to and passing through existing station in underneath mode" CN214273664U, Sep. 24, 2021 (Year: 2021).*

Espacenet machine translation, Wei Gang et al., "Method for calculating bending moment and strain of undergroun pipeline caused by ground access type shield construction" CN106250618A, Dec. 21, 2016 (Year: 2016).*

Espacenet machine translation, Feng Lihua et al., "Construction monitoring method for all-directional shield underneath passing of existing subway station." CN113236260A, Aug. 10, 2021 (Year: 2021).*

Du et al., "Case study on double-deck subway station undercrossing and analysis of filed monitoring about this case," Rock and Soil Mechanics, Jul. 2019, vol. 40, No. 7, pp. 2765-2773.

Jiang et al., "Theoretical Analysis on Mindlin Stress Formulas," Building Science, Mar. 2008, vol. 24, No. 3, pp. 19-20.

Liu et al., "Zircon SHRIMP U-Pb Dating of the Tourmalinites from Boron-bearing Series of Borate Deposits in Eastern Liaoning and its Geological Implications," Acta Geologica Sinica, Feb. 2012, vol. 86, No. 1, pp. 118-130.

Nov. 30, 2022 Office Action issued in Chinese Patent Application No. 202210801408.3.

* cited by examiner

METHOD FOR DETERMINING ACTIVE JACKING FORCE OF TUNNELING CLOSELY UNDERCROSSING EXISTING STATION

TECHNICAL FIELD

The present invention relates to the field of railway transit engineering technologies, and in particular relates to a method for determining an active jacking force of a tunneling closely undercrossing existing station.

BACKGROUND

The statements in this section only provide background technical information related to the present invention and do not necessarily constitute the prior art.

In the process of railway transit expansion and reconstruction, the construction condition of a transfer station where a new line intersects with an existing line is complex. Currently, a construction method of buried-tunneling of a new metro station closely undercrossing an existing station is commonly used. Disturbance for the existing station is greatly influenced due to lack of sandwiched soil to provide bearing capacity in this method. If an active support measure is not taken, excessive settlement of the existing station may be caused to lead to safety issues.

In order to address the above-mentioned issues, active jacking manners currently used are all under displacement control, but without stress control, and thus, an existing structure is prone to being uplifted and damaged due to excessive stress. As for a method for calculating an active jacking force, due to lack of corresponding theoretical support, empirical determination is often used on site. When the active jacking force is too small, the effect is not obvious, but when the jacking force is too large, the existing station will be uplifted and damaged. As a result, a method for designing active underpinning of a closely undercrossing existing station is not clear, which seriously influences the active underpinning design during construction.

SUMMARY

In order to solve at least one technical problem in the background, the present invention provides a method for determining an active jacking force of a tunneling closely undercrossing existing station. The existing station is simplified as a section of homogeneous long beam to form a beam-on-elastic-foundation model; vertical stress on the existing station under the combined action of unloading stress and the active jacking force is solved by Mindlin's solution; and then, the active jacking force that controls the settlement of the existing station to be within a safe range can be solved according to a deflection curve differential equation of a beam on elastic foundation. Thus, the active jacking force can be determined in a theoretical manner by utilizing actual parameters collected on site from existing and new stations, so that the active jacking force is controlled to avoid the uplift and damage of the existing station.

In order to achieve the above-mentioned object, the present invention uses the following technical solution:

a first aspect of the present invention provides a method for determining an active jacking force of a tunneling closely undercrossing existing station, including:

acquiring design parameters of existing and new stations, and acquiring geological parameters of a construction site;

obtaining a stress solution expression of the active jacking force on the existing station according to the design parameters, the geological parameters and a Mindlin's solution calculation model to obtain a stress solution $\sigma_z$ of any point in a semi-infinite space under the action of a vertical load P, replacing the vertical load $\beta$ with a vertical load acting on the existing station, and performing integration in an excavation region to obtain a vertical stress solution C of the existing station;

obtaining a relational expression between the deflection and the stress solution C of the existing station according to a differential equation of a beam-on-elastic-foundation model; and substituting the stress solution expression of the active jacking force on the existing station into the relational expression between the deflection and the stress solution $\sigma_{z'}$ of the existing station according to boundary conditions at both ends of a beam on elastic foundation to obtain the active jacking force that controls the deflection of the existing station.

The beam-on-elastic-foundation model is that the existing station is simplified as a section of homogeneous long beam, where a region subjected to excavation disturbance is an isolation body with a length of L. The upper portion of the beam bears the unloading stress $P_1$ produced by soil excavation. The width of the new station is $l_0$. The isolation body with the length of L applies the active jacking force $P_2$ within the range of $l_0$.

An expression of the vertical stress solution $\sigma_z$ of any point in the semi-infinite space under the action of a certain vertical load $\beta$ is:

$$\sigma_z = \frac{P}{8\pi(1-\mu_0)}\left[\frac{(1-2\mu)(z-d)}{R_1^3} - \frac{(1-2\mu)(z-d)}{R_2^3} + \frac{3(z-d)^3}{R_1^5} + \frac{30dz(z+d)^3}{R_2^7} + \frac{3(3-4\mu)z(z+d)^2 - 3d(z+d)(5z-d)}{R_2^5}\right] \quad (1)$$

where $\mu_0$ is the Poisson's ratio of a soil mass, d is the depth of load action, $R_1$ and $R_2$ are distances from a load action point (0, 0, d) and a symmetrical point (0, 0, −d) relative to the ground to any point (x, y, z), respectively.

The vertical load $\beta$ of the new station is a difference between the unloading stress $P_1$ and the active jacking force $P_2$.

The expression of the vertical stress solution $\sigma_z$ of any point in the semi-infinite space under the action of the certain vertical load $\beta$ is processed simultaneously with a relational expression between the vertical load $\beta$ and unloading stress $P_1$ and an active jacking force $P_2$ of the new station, and integration is performed in the excavation region to obtain the stress solution expression of the active jacking force on the existing station. After simplification, the expression of the vertical stress solution $\sigma_{z'}$ of the existing station is obtained.

The relational expression between the deflection and the stress solution C of the existing station is obtained according to the differential equation of the beam-on-elastic-foundation model:

$$EI\frac{d^4w}{dx^4} + kw = \sigma_y,$$

in the formula, E is the elastic modulus of the existing station, I is the inertia moment of the existing station, w is the deflection of the existing station, $k=k_0 f$, and $k_0$ is a foundation coefficient that reflects the interaction between soil and the existing station.

After simplification, the relational expression between the deflection and the stress solution $\sigma_{z'}$ of the existing station is converted into a fourth-order non-homogeneous linear equation with constant coefficients, and a general solution thereof is:

$$w = e^{\beta x}(A\cos\beta x + B\sin\beta x) + e^{-\beta x}(C\cos\beta x + D\sin\beta x) + \frac{\sigma_y}{k},$$

where $\beta$ is a characteristic coefficient, with a dimension of $m^{-1}$; A, B, C and D are four unknown coefficients in the general solution, which are obtained by the boundary conditions at both ends of the beam on elastic foundation; and x is a horizontal coordinate in the beam-on-elastic-foundation model, and e is a natural constant.

The boundary conditions at both ends of the beam on elastic foundation are bending moments of the beam on elastic foundation with horizontal coordinates of 0 and $l_0$:

$M|_{x=0}=0, M|_{x=l_0}=0$ $Q|_{x=0}=0, Q|_{x=l_0}=0,$ where M is the bending moment and Q is a shearing force.

Required parameters are obtained according to the boundary conditions at both ends of the beam on elastic foundation, and the stress solution expression of the active jacking force on the existing station is substituted into the relational expression between the deflection and the stress solution $\sigma_{z'}$ of the existing station to obtain the active jacking force that controls the deflection of the existing station.

Compared with prior art, the above-mentioned one or more technical solutions have the following beneficial effects:

1. The existing station is simplified as the beam-on-elastic-foundation model; the vertical stress on the existing station under the combined action of the unloading stress and the active jacking force is solved by Mindlin's solution; and then, the active jacking force that controls the settlement of the existing station to be within the safe range can be solved according to the deflection curve differential equation of the beam on elastic foundation. Thus, the active jacking force can be determined in a theoretical manner by utilizing the actual parameters collected on site from the existing and new stations, so that the active jacking force is controlled to avoid the uplift and damage of the existing station.
2. A calculation model of the active jacking force is provided, and the existing station is simplified as a section of homogeneous long beam. For the convenience of calculation, a part in a region only disturbed by excavation is taken out as the isolation body. The upper portion of the beam bears the unloading stress produced by soil excavation. The active jacking force is applied within an excavation range of the new station.
3. After the vertical stress solution $\sigma_{z'}$ of the existing station is solved, the fundamental differential equation of the beam on elastic foundation is obtained according to the relationship between the force and the deflection. Various coefficients of the fundamental differential equation are solved by the boundary conditions, and thus the active jacking force for the settlement of the existing station is obtained in a theoretical manner.
4. After the active jacking force is added, the settlement of the existing station can be effectively controlled. The active jacking force is inversely proportional to the settlement of the existing station. The larger the active jacking force, the smaller the settlement. However, if the active jacking force is too large, the uplift and damage of existing station will be caused.

After the active jacking force is obtained, the settlement of station can be changed by controlling the magnitude of the active jacking force.
5. In engineering of the use of active underpinning, it is only necessary to calculate the active jacking force that can guarantee the settlement of the existing station within a safe range, and then the active jacking force is added to the bottom of the existing station accordingly, and thus, the settlement of the existing station can be reduced or even avoided, which is conducive to guiding practical engineering construction.

BRIEF DESCRIPTION OF THE DRAWINGS

The accompanying drawings of the description, which constitute a part of the present invention, are used for providing a further understanding of the present invention. The exemplary embodiments of the present invention and descriptions thereof are used for explaining the present invention and do not constitute an improper limitation of the present invention.

DETAILED DESCRIPTION

The present invention is further described below in conjunction with the accompanying drawings and the embodiments.

It should be pointed out that the following detailed descriptions are exemplary and aim to provide further descriptions of the present invention. Unless otherwise specified, all technical and scientific terms used herein have the same meanings as those commonly understood by those of ordinary skill in the art to which the present invention belongs.

It should be noted that the terms used herein are only for describing specific implementations, and are not intended to limit exemplary implementations according to the present invention. As used herein, unless otherwise explicitly specified in the context, the singular form is also intended to include the plural form. In addition, it should be understood that the terms "include/including" and/or "comprise/comprising" used in this description indicate the presence of features, steps, operations, devices, components and/or combinations thereof.

As described in the background, the method for calculating the active jacking force used for the transfer station where the new line intersects with the existing line lacks the corresponding theoretical support, and therefore, empirical determination is often used on site. If the active jacking force is too small, the effect is not obvious, but if the jacking force is too large, the existing station will be uplifted and damaged. As a result, a method for designing active underpinning of a closely undercrossing existing station is not clear, which seriously influences the active underpinning design during construction.

The following embodiments provide a method for determining an active jacking force of a tunneling closely undercrossing existing station. The existing station is simplified as a section of homogeneous long beam to form a beam-on-elastic-foundation model; vertical stress on the existing station under the combined action of unloading stress and the active jacking force is solved by Mindlin's solution; and then, the active jacking force that controls the settlement of the existing station to be within a safe range can be solved according to a deflection curve differential equation of a beam on elastic foundation. Thus, the active jacking force can be determined in a theoretical manner by utilizing actual parameters collected on site from existing and new stations, so that the active jacking force is controlled to avoid the uplift and damage of the existing station.

Embodiment I

Figure 1:
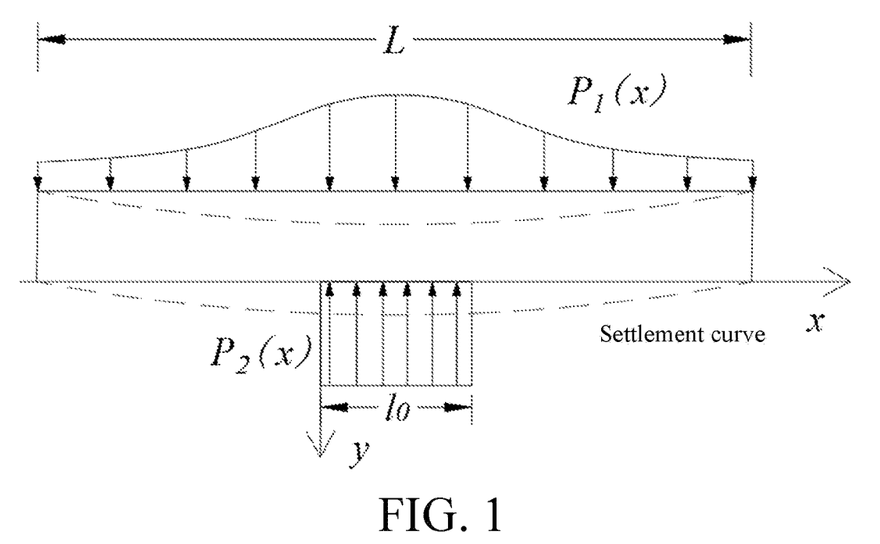
FIG. 1 is a schematic diagram of a calculation model of an active jacking force provided by one or more embodiments of the present invention.
Figure 2:
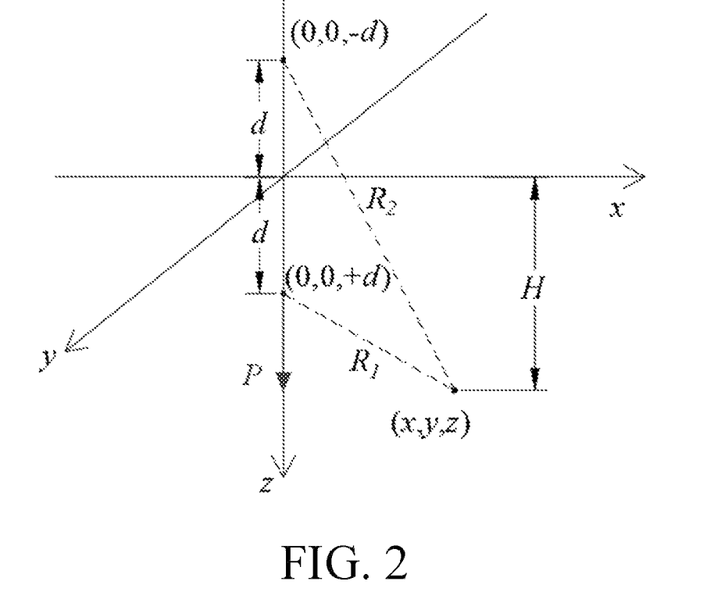
FIG. 2 is a schematic diagram of a Mindlin's solution calculation model provided by one or more embodiments of the present invention.
Figure 3:
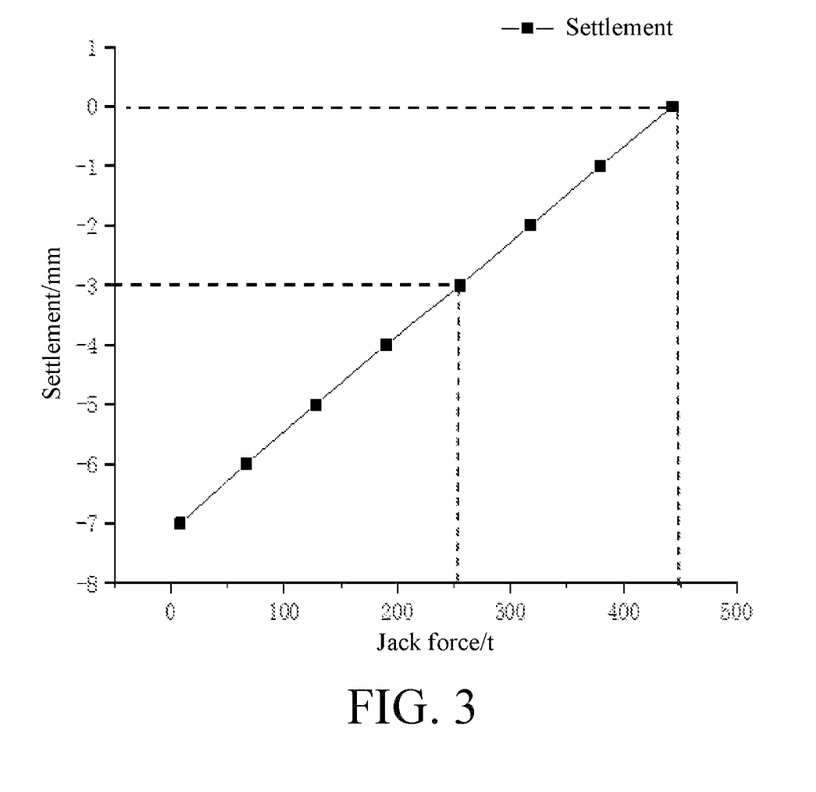
FIG. 3 is a schematic diagram of a relationship between a jack force and settlement provided by one or more embodiments of the present invention.

As shown in FIGS. 1 to 3, an object of this embodiment is to provide a method for determining an active jacking force of a tunneling closely undercrossing existing station, including:
acquiring design parameters of existing and new stations, and acquiring geological parameters of a construction site;
obtaining a stress solution expression of the active jacking force on the existing station according to the design parameters, the geological parameters and a Mindlin's solution calculation model to obtain a stress solution $\sigma_z$ of any point in a semi-infinite space under the action of a concentrated force P, replacing the concentrated force β with a vertical load acting on the existing station, and performing integration in an excavation region to obtain a vertical stress solution $\sigma_{z'}$ of the existing station;
obtaining a relational expression between the deflection and the stress solution $\sigma_{z'}$ of the existing station according to a differential equation of a beam-on-elastic-foundation model; and
substituting the stress solution expression of the active jacking force on the existing station into the relational expression between the deflection and the stress solution $\sigma_{z'}$ of the existing station according to boundary conditions at both ends of a beam on elastic foundation to obtain the active jacking force that controls the deflection of the existing station.

Specifically:
(1) Overall Technical Idea
Forces influencing the existing station by the construction of the new station can be roughly divided into two forces: one force is unloading stress that will be produced on the existing station by down heading excavation, and the other force is the active jacking force that will be applied within an excavation range to guarantee the safety of the existing station. The vertical stress on the existing station under the combined action of the unloading stress and the active jacking force can be solved by Mindlin's solution (a formula that has been derived by American scholar Mindlin in 1936 for the stress in the foundation caused by a concentrated force in a semi-infinite body), and then, the active jacking force that controls the settlement of the existing station within a safe range can be solved according to the deflection curve differential equation of the beam on elastic foundation.

(2) Beam-On-Elastic-Foundation Model
When the beam-on-elastic-foundation model under working conditions of the tunneling closely undercrossing existing station is established, the existing station is simplified as a homogeneous long beam. For the convenience of calculation, a part in a region only disturbed by excavation is taken out as the isolation body, with a length of L. The upper portion of the beam bears unloading stress $P_1$ produced by soil excavation. The width of the new station is $l_0$, and an active jacking force $P_2$ is applied within the range of $l_0$. The beam-on-elastic-foundation model is as shown in FIG. 1.

(3) Calculation Formula for Stress Solution of Existing Station
The vertical stress on the existing station under the combined action of the unloading stress and the active jacking force can be calculated by using Mindlin's solution. Mindlin's solution is the stress solution of any point in the semi-infinite space under the action of the vertical load or a horizontal load. The Mindlin's solution calculation model is as shown in FIG. 2.

An expression of the vertical stress solution $\sigma_z$ of any point in the semi-infinite space under the action of a certain vertical load β is respectively:

$$\sigma_z = \frac{P}{8\pi(1-\mu_0)} \left[ \frac{(1-2\mu)(z-d)}{R_1^3} - \frac{(1-2\mu)(z-d)}{R_2^3} + \frac{3(z-d)^3}{R_1^5} \right. \tag{1}$$
$$\left. + \frac{30dz(z+d)^3}{R_2^7} + \frac{3(3-4\mu)z(z+d)^2 - 3d(z+d)(5z-d)}{R_2^5} \right]$$

$\mu_0$ is the Poisson's ratio of a soil mass, d is the depth (m) of load action; $R_1$ and $R_2$ are distances from a load action point (0, 0, d) and a symmetrical point (0, 0, −d) relative to the ground to any point (x, y, z), respectively.

In the beam-on-elastic-foundation model, in addition to including the unloading stress caused by soil excavation, which will cause the settlement of the existing station, the forces that influence the existing station include the active jacking force for the excavation region, which will act on the existing station in the opposite direction of settlement. Therefore, in this embodiment, the vertical load acting on the new station is a difference between the unloading stress and the active jacking force:

$$P = P_1 - P_2 \tag{2}$$

Simultaneous processing is performed on formulas (1) and (2), and integration is performed in the excavation region, and therefore, the expression regarding the stress solution of the active jacking force on the existing station can be obtained:

$$\sigma_y = \frac{P_2 - P_1}{8\pi(1-\mu)} \int_0^{l_0} \int_0^f \left[ -\frac{(1-2\mu)(h-H)}{R_1^3} \right. \tag{3}$$
$$+ \frac{(1-2\mu)(h-H)}{R_2^3} - \frac{3(h-H)^3}{R_1^5} - \frac{30Hh(h+H)^3}{R_2^7}$$
$$\left. - \frac{3(3-4\mu)h(h+H)^2 - 3H(h+H)(5h-H)}{R_2^5} \right]$$

In the formula, μ is the Poisson's ratio of the existing station; h is the burial depth (m) of the existing station; H is the burial depth (m) of the new station; $l_0$ is the width (m) of the new station; f is the width (m) of the existing station; $R_1$ and $R_2$ are distances from a certain point (λ,η, H) on the roof of the new station and a symmetrical point (λ,η, −H) relative to the ground to any point ($x_1$, $y_1$, h), respectively.

The following formula can be obtained by performing integration and simplification on equation (3):

$$\sigma_y = \frac{P_1 - P_2}{8\pi(1-\mu)} \left\{ (-2+2\mu) \arctan \frac{a}{(c-b)\sqrt{1+a^2+(c-b)^2}} \right.$$
$$+ (2-2\mu) \arctan \frac{a}{(c+b)\sqrt{1+a^2+(c+b)^2}}$$
$$- \frac{a[1+a^2+2(c-b)^2](c-b)}{[1+(c-b)^2][a^2+(c-b)^2]\sqrt{1+a^2+(c-b)^2}}$$
$$- \frac{2abc(b+c)^3}{[1+(b+c)^2][1+a^2+(c+b)^2]^{3/2}} + \frac{2abc(b+c)^3(c+b-1)(c+b+1)}{[1+(b+c)^2]^2\sqrt{1+a^2+(c+b)^2}}$$
$$+ \frac{4abc(c+b)\sqrt{1+a^2+(c+b)^2}}{[a^2+(c+b)^2]^2} - \frac{2abc[-3+(c+b)^2]\sqrt{1+a^2+(c+b)^2}}{(c+b)[a^2+(c+b)^2]}$$
$$\left. + \frac{a[1+a^2+2(c+b)^2][c^2-2cb+3b^2-4b\mu(c+b)]}{(c+b)[1+(c+b)^2][a^2+(c+b)^2]\sqrt{1+a^2+(c+b)^2}} \right\} \quad (4)$$

In the formula $$a = \frac{f}{l_0}, \, b = \frac{h}{l_0}, \, c = \frac{H}{l_0},$$

the stress solution on the existing station can be obtained by substituting various values according to the actual engineering situation $\sigma_z$.

(4) Calculation Formula for Active Jacking Force

After the vertical stress expression of the existing station is obtained from formula (4), the relational expression between the deflection and the stress solution of the existing station can be solved according to the fundamental differential equation of the beam on elastic foundation:

$$EI \frac{d^4 w}{dx^4} + kw = \sigma_y. \quad (5)$$

In the formula, E is the elastic modulus ($kN/m^2$) of the existing station, I is the inertia moment ($m^4$) of the existing station, w is the deflection (m) of the existing station, and $k = k_0 f$, where $k_0$ is a foundation coefficient, which is an important parameter that reflects the interaction between soil and the existing station, and the specific value may be referred to Table 1.

TABLE 1

The Value for Foundation Coefficient $k_0$

| Strata grade | Strata hardness coefficient $f_k$ | Strata representatives | $k_0$ (N/m³) |
|---|---|---|---|
| Hard | 8 | Hard limestone; Hard sandstone | $1.2 \times 10^6$ to $2.0 \times 10^6$ |
|  | 6 | Sandstone; Iron ore | $0.8 \times 10^6$ to $1.2 \times 10^6$ |
|  | 5 | Schist; Sandstone | $0.6 \times 10^6$ to $0.8 \times 10^6$ |
| Medium | 4 | Hover sandstone and limestone; Soft conglomerate | $0.4 \times 10^6$ to $0.6 \times 10^6$ |
|  | 3 | Hover schist; Dense marl | $0.3 \times 10^6$ to $0.4 \times 10^6$ |
|  | 2 | Soft schist; Soft limestone; Frozen soil | $0.2 \times 10^6$ to $0.3 \times 10^6$ |
|  | 1.5 | Gravel soil; Hardened clay; Hard coal | $0.12 \times 10^6$ to $0.3 \times 10^6$ |
|  | 1 | Solid clay; Hard impact soil; Stone-mixed soil | $0.06 \times 10^6$ to $0.12 \times 10^6$ |
| Loose | 0.6 | Wet sand; Clayey sand; Planting soil; Peat | $0.03 \times 10^6$ to $0.06 \times 10^6$ |

For further solving, formula (5) can be rewritten as the following form:

$$\frac{d^4w}{dx^4} + \left(\frac{k}{4EI}\right)4w = \frac{\sigma_y}{EI}. \quad (6)$$

To simplify the formula, parameters $$\frac{k}{4EI}$$

in formula (6) are:

$$\beta = \sqrt[4]{\frac{k}{4EI}}. \quad (7)$$

In the formula, $\beta$ is a characteristic coefficient, with a dimension of $m^{-1}$, and $\beta$ is a comprehensive index related to the elastic property, about the beam and the foundation, which can influence the stress-strain property of the beam on elastic foundation. The larger the $\beta$ value, the smaller the relative stiffness of the foundation. The reciprocal of $\beta$ is referred to as a particular length.

After the characteristic coefficient is substituted into formula (6) after quadruplication, the fundamental differential equation of the beam on elastic foundation changes to the following form:

$$\frac{d^4w}{dx^4} + 4\beta^4 w = \frac{\sigma_y}{EI}. \quad (8)$$

Formula (8) is a fourth-order non-homogeneous linear equation with constant coefficients, and a general solution thereof can be obtained by performing solving:

$$w = e^{\beta x}(A\cos\beta x + B\sin\beta x) + e^{-\beta x}(C\cos\beta x + D\sin\beta x) + \sigma_z/k \quad (9),$$

where $\beta$ is a characteristic coefficient, with a dimension of $m^{-1}$; A, B, C and D are four unknown coefficients in the general solution, which are obtained by the boundary conditions at both ends of the beam on elastic foundation; and x is a horizontal coordinate in the beam-on-elastic-foundation model, and e is a natural constant.

A formula for 2 boundary conditions can be listed at each end of the beam. Both ends of the beam on elastic foundation are free, and 4 boundary conditions can be listed:

$$M|_{x=0} = 0, M|_{x=l_0} = 0$$

$$Q|_{x=0} = 0, Q|_{x=l_0} = 0 \quad (10),$$

where M is a bending moment, Q is a shearing force, and the boundary conditions at both ends of the beam on elastic foundation are the bending moments of the beam on elastic foundation with horizontal coordinates of 0 and $l_0$.

4 unknown coefficients can be solved from the above boundary conditions. The relational expression between the deflection and the active jacking force $P_2$ of the existing station can be obtained by substituting formula (4) into formula (9).

In practical application, the above-mentioned process includes:

acquiring the design parameters of the existing and new stations, determining the elastic modulus, the Poisson's ratio, the inertia moment and the burial depth of the station; acquiring the geological parameters of the construction site and determining the foundation coefficient;

solving the stress solution Q of any point in the semi-infinite space under the action of a concentrated force $\beta$ by Mindlin's solution, replacing the concentrated force $\beta$ with the vertical load acting on the existing station, and performing integration in the excavation region to obtain the vertical stress solution C of the existing station;

solving the relational expression between the deflection and the stress solution C of the existing station according to the fundamental differential equation of the beam-on-elastic-foundation model; and solving the 4 unknown coefficients according to the 4 boundary conditions, and substituting formula (4) into formula (9) to solve the active jacking force $P_2$ that controls the deflection of the existing station.

In this embodiment, when the beam-on-elastic-foundation model is established, a semi-infinite elastic foundation model is selected, or a Winkle model can also be selected for use. The semi-infinite elastic foundation model is suitable for clay foundations, and the Winkle model is more suitable for practical situations where a compressible soil layer is relatively thin.

The calculation model of the active jacking force is provided in the above-mentioned process, and the existing station is simplified as a section of homogeneous long beam. For the convenience of calculation, a part in a region only disturbed by excavation is taken out as the isolation body. The upper portion of the beam bears the unloading stress $P_1$ produced by soil excavation. The active jacking force $P_2$ is applied within the excavation range of the new station.

According to the above-mentioned method for calculating the active jacking force, after the vertical stress solution $\sigma_z$ of the existing station is solved, the fundamental differential equation of the beam on elastic foundation is obtained according to the relationship between the force and the deflection. Various coefficients of the fundamental differential equation are solved by the boundary conditions, and thus the active jacking force for the settlement of the existing station is obtained in a theoretical manner.

After the active jacking force is added, the settlement of the existing station can be effectively controlled. The active jacking force is inversely proportional to the settlement of the existing station. The larger the active jacking force, the smaller the settlement. However, if the active jacking force is too large, the uplift and damage of existing station will be caused. After the active jacking force is obtained, the settlement of station can be changed by controlling the magnitude of the active jacking force.

In engineering of the use of active underpinning, it is only necessary to calculate the active jacking force that can guarantee the settlement of the existing station within a safe range, and then the active jacking force is added to the bottom of the existing station accordingly, and thus, the settlement of the existing station can be reduced or even avoided.

Taking a certain station on Metro Line X in some city as an example, an existing station has a buried depth of 12.3 m and an elastic modulus of 32500 MPa, and a new station has a buried depth of 23.7 m. A strata where Metro Line X is located is bed j of pebbles, the Poisson's ratio of the strata is µ=0.18, weight-specific density is γ=21.5, the excavation width is 9.4 m, and the excavation height is 7.7 m. The relationship between the settlement of the existing station and the active jacking force can be solved by formulas (4) and (9).

The unit of the active jacking force is kM/m². According to the actual engineering design requirements of this station, it can be obtained that a total of 20 jacks are arranged in an undercrossing region. Therefore, it is necessary to multiply the solved active jacking force by the area of the excavation region and then divide the product by the number of jacks, and therefore, a required jacking force for each jack can be obtained. The required jack forces for different settlement is plotted, as shown in FIG. 3.

From FIG. 3, it can be seen that if the jack force is not applied, the excavation of a lower soil mass will lead to a settlement of 7.17 mm in an existing structure, which seriously exceeds the relevant specified settlement control standards for the existing structure, and therefore, the existing station may be damaged and its normal use may be influenced. When each jack force reaches 250 t or above, the settlement of the existing station can be controlled to be within 3 mm. When the jack force is 443 t, the theoretical settlement of the existing station is zero, and therefore, the jack force should be controlled to be within the range of 200 to 343 t.

The foregoing is only a preferred embodiment of the present invention and is not intended to limit the present invention. For those skilled in the art, the present invention may have various changes and variations. Any modifications, equivalent substitutions, improvements, etc. made within the spirit and principles of the present invention shall be included within the scope of protection of the present invention.

What is claimed is:

1. A method for determining and applying an active jacking force of a tunneling closely undercrossing existing station, comprising:
    acquiring design parameters of existing and new stations, and acquiring geological parameters of a construction site;
    obtaining a stress solution expression of the active jacking force on the existing station according to the design parameters, the geological parameters and a Mindlin's solution calculation model to obtain a vertical stress solution $\sigma_z$ of any point in a semi-infinite space under the action of a vertical load P, replacing the vertical load $\beta$ with a vertical load acting on the existing station, and performing integration in an excavation region to obtain a vertical stress solution $\sigma_{z'}$ of the existing station;
    obtaining a relational expression between a deflection and the vertical stress solution $\sigma_{z'}$ of the existing station according to a differential equation of a beam-on-elastic-foundation model, wherein
    the relational expression between the deflection and the vertical stress solution $\sigma_{z'}$ of the existing station is:

$$EI\frac{d^4w}{dx^4} + kw = \sigma_{y},$$

E is the elastic modulus of the existing station, I is the inertia moment of the existing station, w is the deflection of the existing station, k=k₀f, k₀ is a foundation coefficient that reflects the interaction between soil and the existing station, and f represents the width of the existing station,
    the relational expression between the deflection and the vertical stress solution $\sigma_{z'}$ of the existing station is converted into a fourth-order non-homogeneous linear equation with constant coefficients after simplification, and a general solution thereof is:

$$w = e^{\beta x}(A\cos\beta x + B\sin\beta x) + e^{-\beta x}(C\cos\beta x + D\sin\beta x) + \frac{\sigma_y}{k}, \text{ and}$$

$\beta$ is a characteristic coefficient, with a dimension of $m^{-1}$;
    A, B, C and D are four unknown coefficients in the general solution, which are obtained by the boundary conditions at both ends of the beam on elastic foundation; and x is a horizontal coordinate in the beam-on-elastic-foundation model, and e is a natural constant;
    substituting the stress solution expression of the active jacking force on the existing station into the relational expression between the deflection and the vertical stress solution $\sigma_{z'}$ of the existing station according to required parameters obtained according to boundary conditions at both ends of a beam on elastic foundation to obtain the active jacking force that controls the deflection of the existing station; and
    applying the active jacking force by with a plurality of jacks, each of the plurality of jacks applying a respective portion of the active jacking force,
    an expression of the vertical stress solution $\sigma_z$ of any point in the semi-infinite space under the action of a certain vertical load $\beta$ is:

$$\sigma_z = \frac{P}{8\pi(1-\mu_0)}\left[\frac{(1-2\mu)(z-d)}{R_1^3} - \frac{(1-2\mu)(z-d)}{R_2^3} + \frac{3(z-d)^3}{R_1^5} + \frac{30dz(z+d)^3}{R_2^7} + \frac{3(3-4\mu)z(z+d)^2 - 3d(z+d)(5z-d)}{R_2^5}\right],$$

wherein µ is Poisson's ratio of the existing station, $\mu_0$ is Poisson's ratio of a soil mass, d is the depth of load action, $R_1$ and $R_2$ are distances from a load action point (0, 0, d) and a symmetrical point (0, 0, −d) relative to the ground to any point (x, y, z), respectively;
    the expression of the vertical stress solution $\sigma_z$ of any point in the semi-infinite space under the action of the certain vertical load $\beta$ is processed simultaneously with a relational expression between the vertical load $\beta$ and unloading stress $P_1$ and an active jacking force $P_2$ of the new station, and integration is performed in the excavation region to obtain the stress solution expression of the active jacking force on the existing station; and
    the expression of the vertical stress solution of the existing station is obtained after the vertical stress solution $\sigma_{z'}$ of the existing station expression of the active jacking force on the existing station is simplified.

2. The method for determining and applying an active jacking force of a tunneling closely undercrossing existing station according to claim 1, wherein the beam-on-elastic-foundation model is that the existing station is simplified as a section of homogeneous long beam; a region subjected to excavation disturbance is an isolation body with a length of L; the upper portion of the beam bears the unloading stress $P_1$ produced by soil excavation; the width of the new station is $l_0$; and the isolation body with the length of L applies the active jacking force $P_2$ within the range of $l_0$.

3. The method for determining and applying an active jacking force of a tunneling closely undercrossing existing station according to claim 1, wherein the vertical load β of the new station is a difference between the unloading stress $P_1$ and the active jacking force $P_2$.

4. The method for determining and applying an active jacking force of a tunneling closely undercrossing existing station according to claim 1, wherein the boundary conditions at both ends of the beam on elastic foundation are bending moments of the beam on elastic foundation with horizontal coordinates of 0 and $l_0$:

$$M|_{x=0}, M|_{x=l_0}=0$$

$$Q|_{x=0}, Q|_{x=l_0}=0,$$

wherein M is the bending moment and Q is a shearing force.

\* \* \* \* \*